(12) United States Patent
Park et al.

(10) Patent No.: US 8,364,074 B2
(45) Date of Patent: Jan. 29, 2013

(54) ON-CHANNEL REPEATER FOR FEEDBACK CAPABLE OF REMOVING FEEDBACK SIGNALS BASED ON PILOT PARTITIONING AND METHOD THEREOF

(75) Inventors: Sung-Ik Park, Daejon (KR); Yong-Tae Lee, Daejon (KR); Jong-Soo Lim, Daejon (KR); Soo-In Lee, Daejon (KR); Ji-Bong Lee, Busan (KR); Wan-Jin Kim, Busan (KR); Hyoung-Nam Kim, Busan (KR); Kyung-Sik Son, Busan (KR)

(73) Assignee: Electronics and Telecommunications Research Institute, Daejon (KR)

( * ) Notice: Subject to any disclaimer, the term of this patent is extended or adjusted under 35 U.S.C. 154(b) by 372 days.

(21) Appl. No.: 12/681,966

(22) PCT Filed: Jun. 10, 2008

(86) PCT No.: PCT/KR2008/003220
§ 371 (c)(1),
(2), (4) Date: Apr. 7, 2010

(87) PCT Pub. No.: WO2009/048215
PCT Pub. Date: Apr. 16, 2009

(65) Prior Publication Data
US 2010/0210205 A1    Aug. 19, 2010

(30) Foreign Application Priority Data

Oct. 10, 2007  (KR) .................. 10-2007-0102111
Oct. 30, 2007  (KR) .................. 10-2007-0109608

(51) Int. Cl.
*H04B 3/36* (2006.01)

(52) U.S. Cl. ............ 455/7; 455/9; 455/63.1; 455/67.11; 455/67.13; 370/315; 375/211

(58) Field of Classification Search ............. 455/7–11.1, 455/14–25, 63.1, 67.11, 67.13; 370/315; 375/211
See application file for complete search history.

(56) References Cited

FOREIGN PATENT DOCUMENTS

| KR | 2002-0016327 A | 3/2002 |
| KR | 2006-0042106 A | 5/2006 |
| KR | 10-0748642 B1 | 8/2007 |
| WO | WO-2007/073092 A1 | 6/2007 |

OTHER PUBLICATIONS

Hiroyuki Hamazumi, et al. "A Study of a Loop Interference Canceller for the Relay Stations in an SFN for Digital Terrestrial Broadcasting." Proceedings of the IEEE Globecom 2000 Conference, San Francisco, CA, USA, Dec. 2000, vol. 1, pp. 167-171.

*Primary Examiner* — Raymond Dean
(74) *Attorney, Agent, or Firm* — Rabin & Berdo, P.C.

(57) ABSTRACT

Provided is an on-channel repeater capable of removing feedback signals based on pilot partitioning, which can efficiently remove a feedback signal by quickly coping with even a situation in which a feedback channel changes rapidly, by reducing a filter-coefficient update interval, i.e., increasing the number of times of filter-coefficient creation, through pilot partitioning, and a method thereof. The on-channel repeater includes: a receiver for receiving a signal; a subtractor for subtracting a replica of a feedback signal from the signal received in the receiver to remove the feedback signal; a replica creator for creating a filter coefficient using pilot partitioning, creating a replica of the feedback signal using the created filter coefficient, and feeding back the created replica to the subtractor; and a transmitter for transmitting an output signal of the subtractor.

12 Claims, 8 Drawing Sheets

ON-CHANNEL REPEATER FOR FEEDBACK CAPABLE OF REMOVING FEEDBACK SIGNALS BASED ON PILOT PARTITIONING AND METHOD THEREOF

TECHNICAL FIELD

The present invention relates to an on-channel repeater capable of removing feedback signals based on pilot partitioning which can repeat the same output signal as a repeater reception signal at the same frequency by estimating a feedback signal caused by low isolation of Tx/Rx antennas from a radio frequency (RF) signal being transmitted and thus compensating distortion of a reception signal, and a method thereof. More particularly, the present invention relates to an on-channel repeater capable of removing feedback signals based on pilot partitioning, which can efficiently remove a feedback signal by quickly coping with even a situation in which a feedback channel changes rapidly, by reducing a filter-coefficient update interval, i.e., increasing the number of times of filter-coefficient creation, through pilot partitioning, and a method thereof.

This work was supported by the IT R&D program of MIC/ IITA [2007-S-006-01, "Development of On-Channel RF repeating technology based on OFDM modulation"].

BACKGROUND ART

In general, a repeater is installed in a region where a signal from a main transmitter is received at a weak level, and it can solve an unstable reception and expand a coverage area of the main transmitter.

Figure 1:
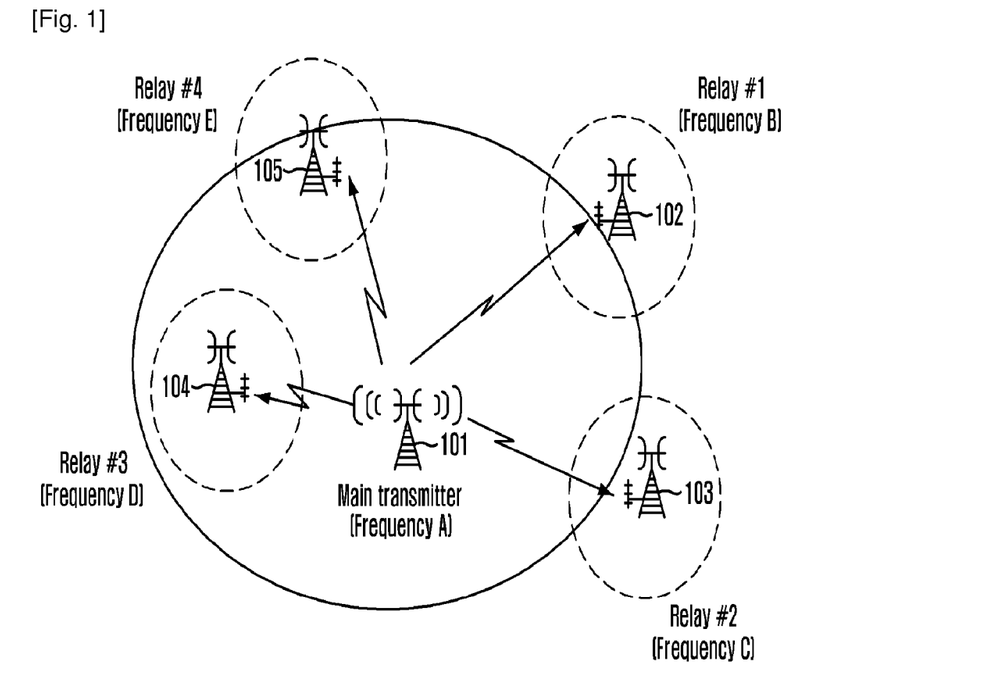
FIG. 1 is a block view explaining an example of a conventional repeating system.

FIG. 1 is a block view explaining an example of a conventional repeating system where repeaters use different frequencies.

Referring to FIG. 1, a main transmitter 101 transmits a signal at a frequency A, and repeaters 102 to 105 relay the signal at frequencies B, C, D and E different from the frequency A. Since the repeaters 102 to 105 use the different frequencies B, C, D and E in the conventional repeating system, multiple frequency bands must be ensured for configuration of the repeating system. Using multiple frequency resources for the repeating system is very inefficient in the aspect of the frequency use.

If multiple repeaters use the same frequency as the main transmitter, an effect of frequency reuse can be obtained even over a short distance, thereby improving frequency use efficiency.

Figure 2:
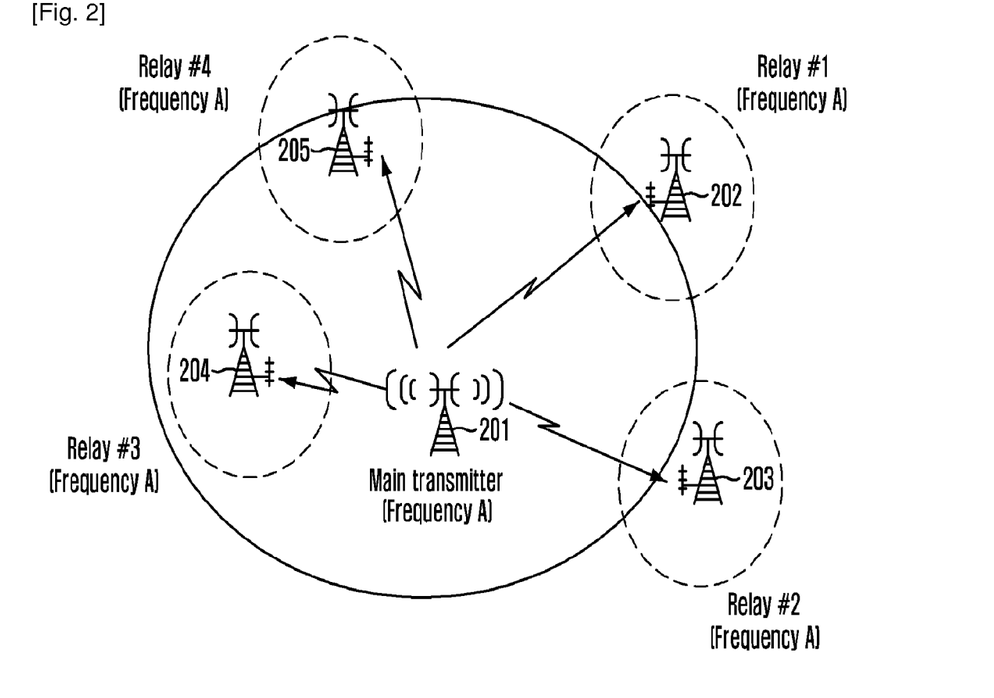
FIG. 2 is a block view explaining another example of a conventional repeating system.

FIG. 2 is a view for explaining another example of a conventional repeating system. In FIG. 2, repeaters are on-channel repeaters using the same frequency.

That is, a main transmitter 201 transmits a signal at a frequency A, and repeaters 202 to 205 relay the signal at the frequency A.

To allow such on-channel repeating, signals of the same frequency respectively transmitted from the main transmitter 201 and the on-channel repeaters 202 to 205 must be distinguishable from each other.

If output signals of the same frequency band, i.e., output signals of the main transmitter 201 and the on-channel repeaters 202 to 205 are not identical, those output signals act as an on-channel interference signal at each repeater, and are not removed by any equalizer or another device.

If signals from the on-channel repeaters 202 to 205 have a delay longer than a predetermined reference with respect to a signal from the main transmitter 201, an equalizer fails to remove the delayed signals.

Therefore, for the on-channel repeating, output signals of the on-channel repeaters 202 to 205 must be identical to an output signal of the main transmitter 201, and the time delay between the two output signals must be small.

Limitations of the conventional on-channel repeaters will now be described with reference to FIGS. 3 to 7.

Figure 3:
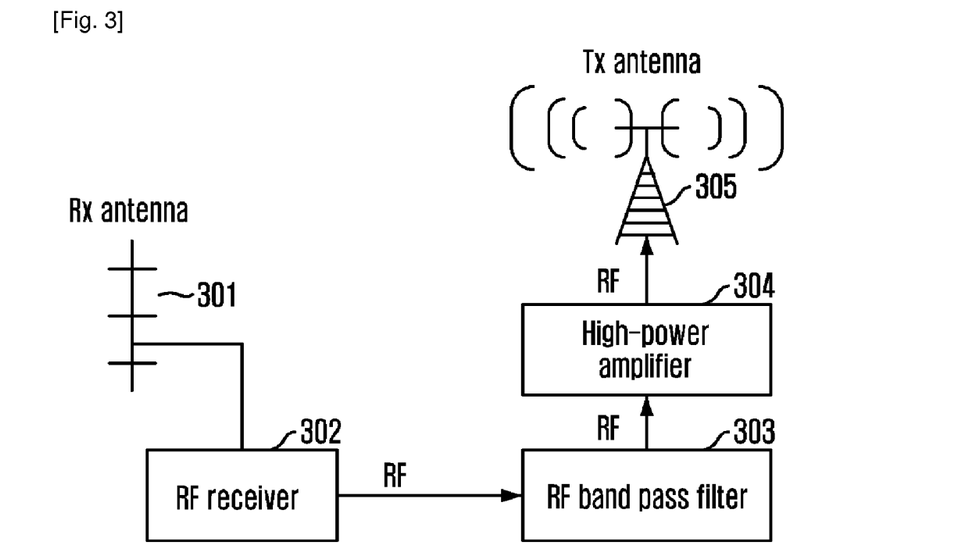
FIG. 3 is a block diagram showing an example of a conventional RF amplification on-channel repeater.

FIG. 3 is a block diagram showing one example of a conventional RF amplification on-channel repeater.

Configurations and operations of the conventional RF amplification on-channel repeater will now be described with reference to FIG. 3. An Rx antenna 301 and an RF receiver 302 receive an RF signal transmitted from a main transmitter. An RF band-pass filter 303 passes only a predetermined signal band of the received RF signal. A high-power amplifier 304 amplifies the passed RF signal, and the amplified RF signal is transmitted via a Tx antenna 305 over the same channel.

Figure 4:
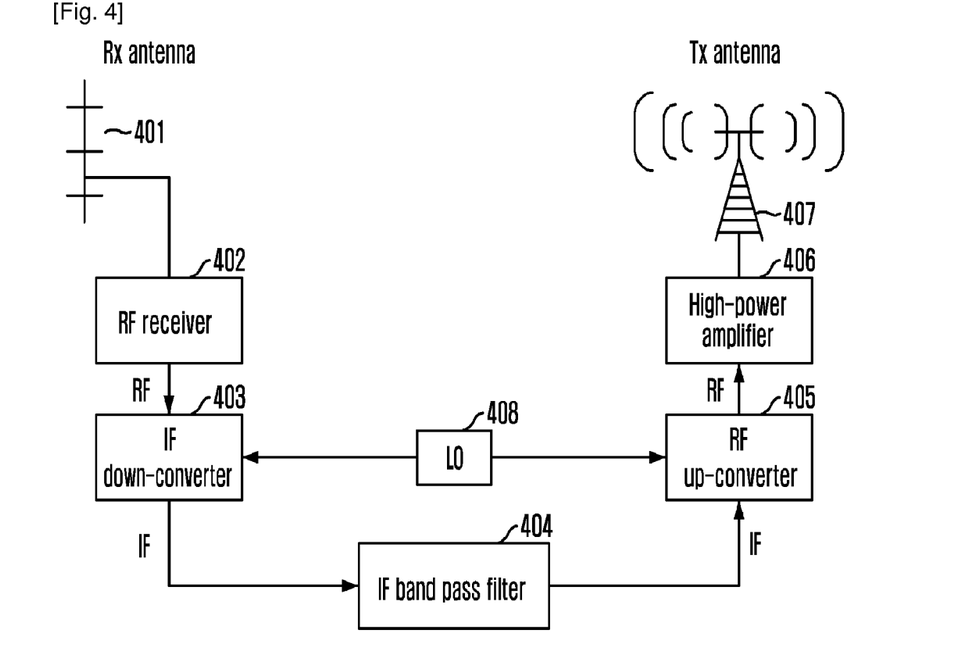
FIG. 4 is a block diagram showing an example of a conventional IF conversion on-channel repeater.

FIG. 4 is a block diagram for explaining an example of a conventional intermediate-frequency (IF) conversion on-channel repeater.

Configurations and operations of the conventional IF conversion on-channel repeater will now be described with reference to FIG. 4. An Rx antenna 401 and an RF receiver 402 receive an RF signal transmitted from a main transmitter. An IF down-converter 403 down-converts the received RF signal into an IF signal based on a reference frequency provided from a local oscillator (LO) 408.

The IF band-pass filter 404 passes only a predetermined band signal of the down-converted IF signal. An RF up-converter 405 up-converts the passed IF signal into an RF signal based on a reference frequency provided from the LO 408. A high-power amplifier 406 amplifies the up-converted RF signal, and the amplified RF signal is transmitted via a Tx antenna 407 over the same channel.

Figure 5:
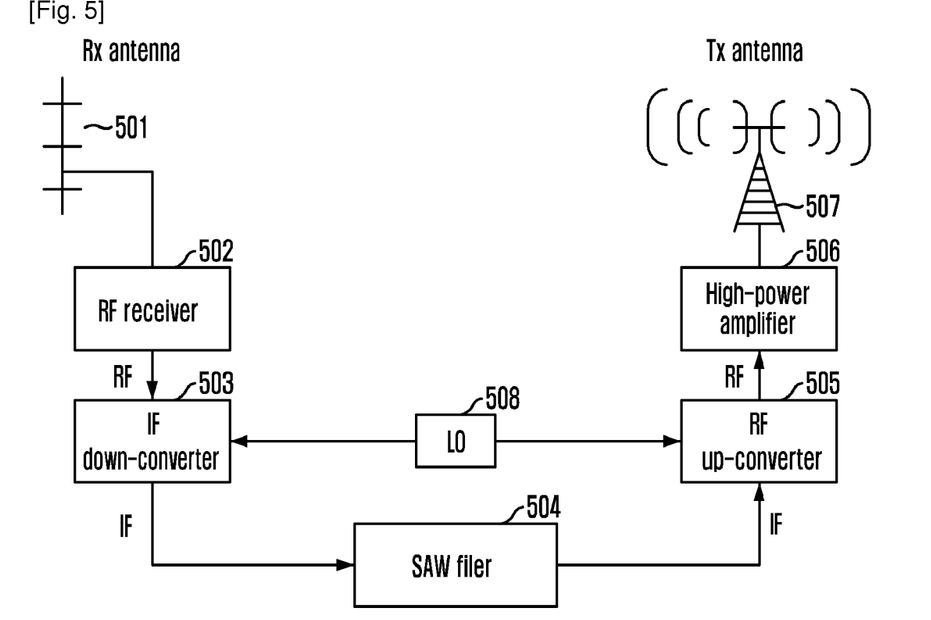
FIG. 5 is a block diagram illustrating an example of an on-channel repeater employing a Surface Acoustic Wave (SAW) filter.

FIG. 5 is a block diagram of an example of a conventional surface acoustic wave (SAW) filter on-channel repeater.

Configurations and operations of the conventional SAW filter on-channel repeater will now be described with reference to FIG. 5. An Rx antenna 501 and an RF receiver 502 receive an RF signal transmitted from a main transmitter. An IF down-converter 503 down-converts the received RF signal into an IF signal based on a reference frequency provided from an LO 508.

A SAW filter 504 passes a predetermined band signal of the down-converted IF signal. An RF up-converter 505 up-converts the passed IF signal into an RF signal based on a reference frequency provided from the LO 508. A high-power amplifier 506 amplifies the up-converted RF signal, and the amplified RF signal is transmitted at the same frequency via a Tx antenna 507.

However, the on-channel repeaters described above with reference to FIGS. 3 to 5 have limited transmission output because of a feedback signal caused by low isolation of the Rx/Tx antennas.

Figure 6:
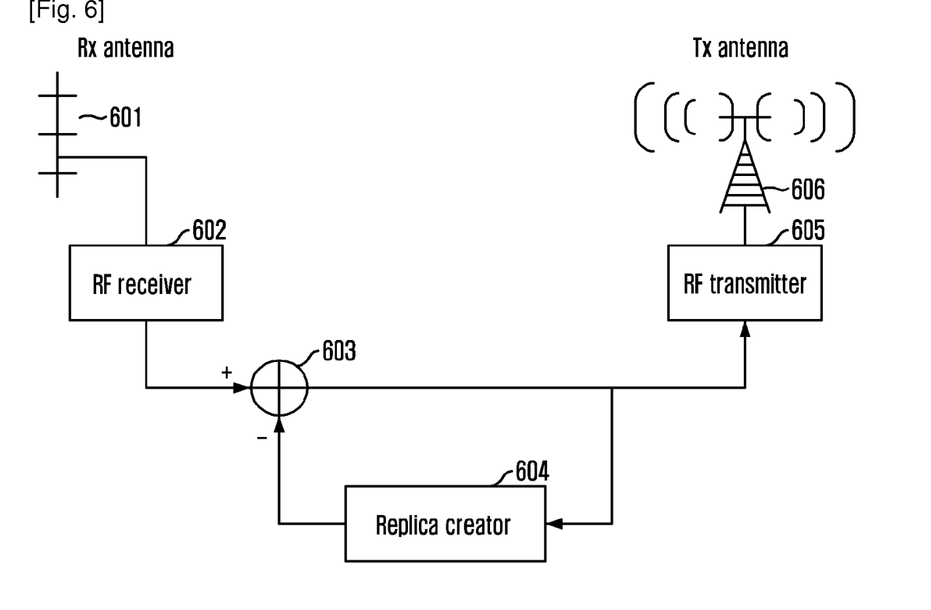
FIG. 6 is a block diagram explaining an example of a conventional demodulation-type on-channel repeater.

FIG. 6 is a block diagram for explaining an example of a conventional demodulation-type on-channel repeater.

Configurations and operations of the conventional demodulation-type on-channel repeater will now be described with reference to FIG. 6. An RF receiver 602 down-converts an RF signal received via an Rx antenna 601 from a main transmitter or another repeater into a signal of a predetermined. A subtractor 603 removes a feedback signal by subtracting a replica of the feedback signal from the down-converted signal of the predetermined band.

A replica creator 604 creates a replica of the feedback signal based on an output signal of the subtractor 603, i.e., a signal without a feedback signal, and feeds back the created replica to the subtractor 603. An RF transmitter 605 converts the output signal of the subtractor 603, i.e., the signal without a feedback signal into an RF signal, and transmits the RF signal via a Tx antenna 606 by radio.

Figure 7:
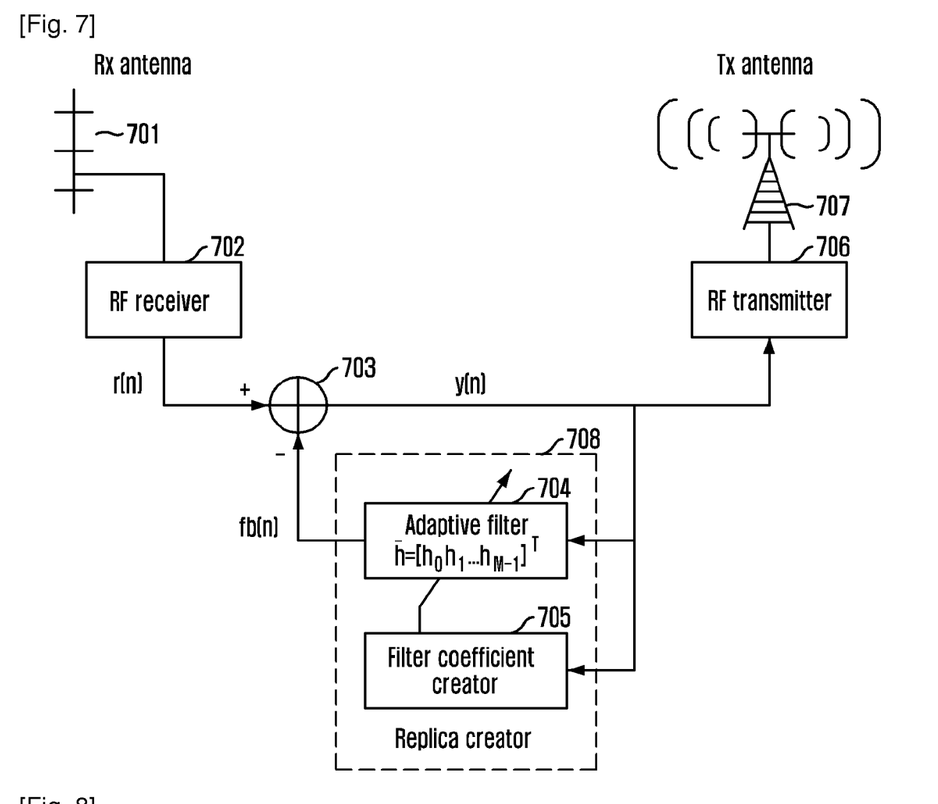
FIG. 7 is a block diagram showing a detailed configuration of the conventional demodulation-type on-channel repeater of FIG. 6.

FIG. 7 is a block diagram illustrating a detailed configuration of the demodulation-type on-channel repeater of FIG. 6.

In FIG. 7, an Rx antenna 701, an RF receiver 702, a subtractor 703, an RF transmitter 706 and a Tx antenna 707 correspond to the Rx antenna 601, the RF receiver 602, the subtractor 603, the RF transmitter 605 and the Tx antenna 606 illustrated in FIG. 6, respectively. Thus, description thereof is omitted.

The replica creator 708 includes a filter coefficient creator 705, and an adaptive filter 704. The filter coefficient creator 705 creates a filter tap coefficient being used at the adaptive filter 704, based on an output signal (i.e., a signal without a feedback signal) of the subtractor 703. The adaptive filter 704 creates a replica of the feedback signal by using the output signal of the subtractor 703 and the filter tap coefficient received from the filter coefficient creator 705, and feeds back the replica to the subtractor 703.

The filter coefficient creator 705 calculates a filter tap coefficient ($\bar{h}_{now}$) according to the Least Mean Square (LMS) algorithm based on the following Equation 1.

Math Figure 1

$$\bar{h}_{now} = \bar{h}_{past} + \lambda \cdot \bar{e}$$ [Math.1]

$$\bar{h}_{now} = [h_{now,0}\ h_{now,1} \ldots h_{now,M-1}]^T$$

$$\bar{h}_{past} = [h_{past,0}\ h_{past,1} \ldots h_{past,M-1}]^T$$

$$\bar{e} = [e_0\ e_1 \ldots e_{M-1}]^T$$ [Math.1]

where
$\bar{e}$
denotes an error signal of a channel calculated based on channel distortion information of an estimated repeater reception channel,
$\bar{h}_{past}$
denotes a previous filter tap coefficient,
$\lambda$
denotes a constant that determines a convergence speed, M denotes a filter tap number, and T denotes a transpose.

The adaptive filter 704 filters an output signal vector ($\bar{y}_n = [y(n)y(n-1) \ldots y(n-M+1)]^T$) at a time index (n) outputted from the subtractor 703 on the basis of the filter tap coefficient ($\bar{h}_{now}$) created by the filter coefficient creator 705, thereby calculating a replica (fb(n)) of a feedback signal based on the following Equation 2.

Math Figure 2

$$fb(n) = \bar{h}_{now}^T \bar{y}_n$$ [Math.2]

The subtractor 703 removes the feedback signal caused by low isolation of the Tx/Rx antennas by subtracting the replica (fb(n)) of the feedback signal calculated at the adaptive filter 704 from the output signal (r(n)) of the RF receiver 702, based on the following Equation 3.

Math Figure 3

$$y(n) = r(n) - fb(n)$$ [Math.3]

Figure 8:
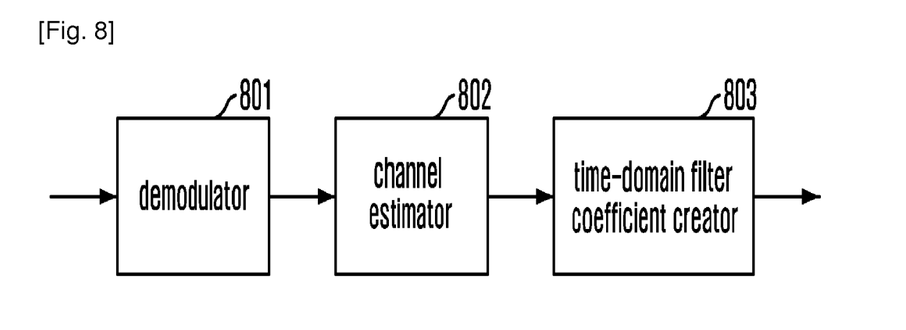
FIG. 8 is a block diagram of a filter coefficient creator of the conventional demodulation-type on-channel repeater of FIG. 7.

FIG. 8 is a block diagram illustrating a detailed configuration of the filter coefficient creator 705 of FIG. 7.

Referring to FIG. 8, the filter coefficient creator 705 includes a demodulator 801, a channel estimator 802 and a time-domain filter coefficient creator 803.

The demodulator 801 receives an output signal (i.e., a signal without a feedback signal) of the subtractor 703, and demodulates the received signal through frequency and timing synchronization.

The channel estimator 802 estimates channel distortion of a repeater reception channel based on the signal demodulated by the demodulator 801. The channel distortion includes, e.g., a noise, a multi-path signal, and a remaining feedback signal caused by a channel between the main transmitter and the on-channel repeater.

The time-domain filter coefficient creator 803 creates an error signal ($\bar{e}$) in a time domain based on the channel distortion information estimated by the channel estimator 803 to create a filter tap coefficient based on the above Equation 1.

However, the demodulation-type on-channel repeater illustrated in FIG. 6 has performance that largely varies according to a structure of a known pilot signal being used for the feedback channel estimation. Particularly, an interval between pilots is closely related to a time interval of filter coefficient update. Thus, if a system has a long interval between pilots, a feedback signal cannot be effectively removed in the situation where a feedback channel changes rapidly.

Since the conventional repeaters described above have limited capability of removing feedback signals, conventional on-channel repeating systems have limitations of low utilization of existing repeating facilities, and high investment costs.

For that reason, the demodulation-type on-channel repeater of FIG. 6 requires a method of reducing a filter-coefficient update interval for high utilization and low investment costs, which can achieve an identical output signal of the on-channel repeater to an output signal of a main transmitter, a short time delay between the two output signals, a quick response to a changing feedback channel, and an increase in transmission output power of the on-channel repeater by removing a feedback signal caused by low isolation of Tx/Rx antennas of the on-channel repeater.

DISCLOSURE OF INVENTION

Technical Problem

An embodiment of the present invention is directed to providing an on-channel repeating apparatus capable of removing feedback signals based on pilot partitioning and a method thereof, which can quickly cope with a rapid change of a feedback channel and thus efficiently remove a feedback signal by reducing an update interval of a filter coefficient, i.e., increasing the number of times of filter-coefficient creation through pilot partitioning.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an on-channel repeater, which includes: a receiver for receiving a signal; a subtractor for subtracting a replica of a feedback signal from the signal received in the receiver to remove the feedback signal; a replica creator for creating a filter coefficient using pilot partitioning, creating a replica of the feedback signal using the created filter coefficient, and feeding back the created replica to the subtractor; and a transmitter for transmitting an output signal of the subtractor.

In accordance with another aspect of the present invention, there is provided an on-channel repeating method, which includes: receiving a signal; subtracting a replica of a feedback signal from the received signal to remove the feedback signal; creating a filter coefficient using pilot partitioning, creating a replica of the feedback signal by using the created filter coefficient, and feeding back the created replica to said subtracting of the replica; and transmitting a signal from which the feedback signal is removed.

Advantageous Effects

In accordance with embodiments of the present invention, a feedback signal can be efficiently removed by a quick response even when a feedback channel rapidly changes by reducing a filter-coefficient update interval, i.e., increasing the number of times of filter-coefficient creation, through pilot partitioning.

Also, in accordance with embodiments of the present invention, efficiency of using limited frequency resources can be improved because of an identical output signal of an on-channel repeater to an output signal of a main transmitter, small time delay between the two output signals, and relay of a distortion-compensated signal on a transmission channel.

MODE FOR THE INVENTION

The advantages, features and aspects of the invention will become apparent from the following description of the embodiments with reference to the accompanying drawings, which is set forth hereinafter. These embodiments are provided so that this disclosure will be thorough and complete, and will fully convey the scope of the present invention to those skilled in the art. In some embodiments, well-known processes, device structures, and technologies will not be described in detail to avoid ambiguousness of the present invention. Preferred embodiments of the present invention will be described below in more detail with reference to the accompanying drawings.

Figure 9:
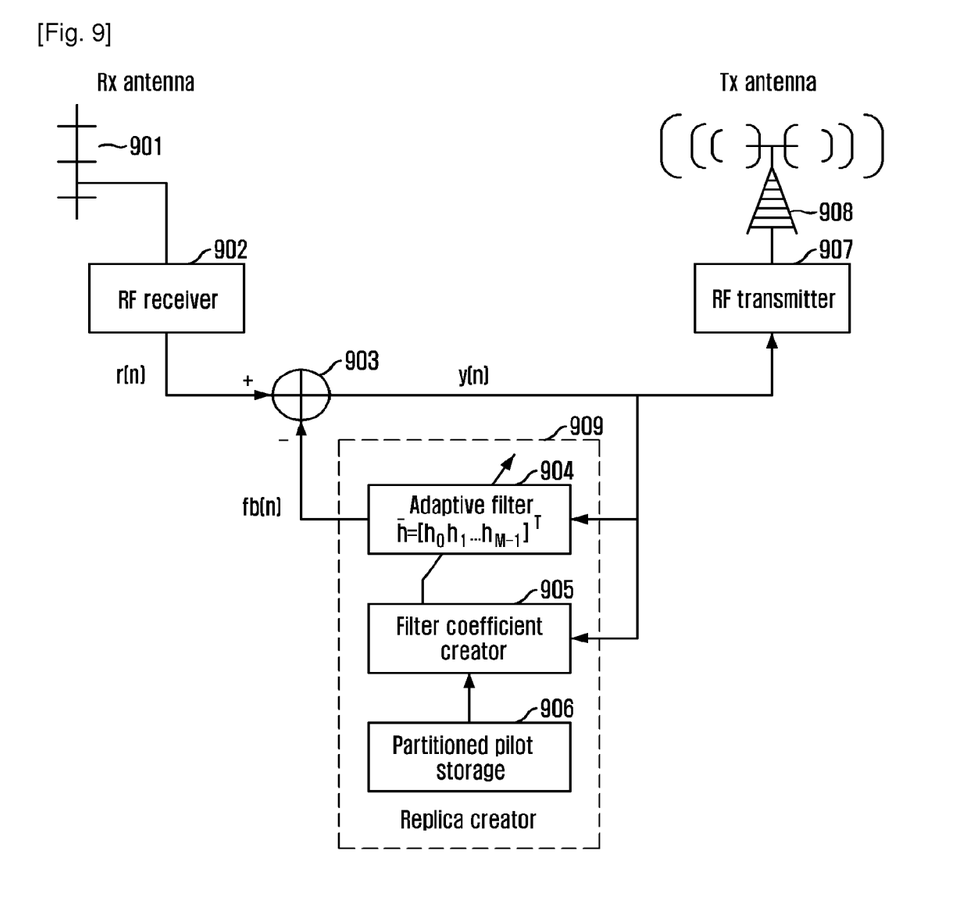
FIG. 9 is a block diagram of an on-channel repeater capable of removing feedback signals based on pilot partitioning in accordance with an embodiment of the present invention.

FIG. 9 is a block diagram showing an on-channel repeater capable of removing feedback signals based on pilot partitioning in accordance with an embodiment of the present invention.

Referring to FIG. 9, the on-channel repeater capable of removing feedback signals based on pilot partitioning in accordance with an embodiment of the present invention includes an Rx antenna 901, an RF receiver 902, a subtractor 903, an RF transmitter 907, a Tx antennal 908, and a replica creator 909. The replica creator 909 creates a filter coefficient through pilot partitioning, creates a replica of a feedback signal by using the created filter coefficient, and feeds back the created replica to the subtractor 903. These elements will now be described in more detail, hereinafter.

An RF signal received via the Rx antenna 901 from a main transmitter or another repeater is down-converted into a signal of a predetermined band by the RF receiver 902. The subtractor 903 subtracts a replica of a feedback signal from the down-converted signal of the predetermined band, thereby removing the feedback signal.

The replica creator 909 creates a filter coefficient through pilot partitioning, creates a replica of the feedback signal by using the created filter coefficient, and feeds back the created replica to the subtractor 903.

The RF transmitter 907 converts an output signal (i.e., a signal without a feedback signal) from the subtractor 903 into an RF signal, and transmits the RF signal via the Tx antenna 908 by radio.

The replica creator 909 includes an adaptive filter 904, a filter coefficient creator 905, and a partitioned-pilot storage 906 for storing a partitioned pilot to be used at the filter coefficient creator 905.

In detail, the partitioned-pilot storage 906 stores a partitioned pilot to be used at the filter coefficient creator 905. The filter coefficient creator 905 creates a filter coefficient, i.e., a filter tap coefficient used at the adaptive filter 904, based on the partitioned pilot stored in the partitioned-pilot storage 906, and an output signal of the subtractor 903, i.e., the signal without a feedback signal.

The adaptive filter 904 creates a replica of the feedback signal by performing adaptive filtering on the output signal of the subtractor 903 using the filter coefficient created by the filter coefficient creator 905, and feeds back the created replica to the subtractor 903.

The partitioned-pilot storage 906 is an element for overcoming limitations of the conventional demodulation-type on-channel repeater. The partitioned pilot storage 906 increases the number of times that the filter coefficient creator 905 creates a filter coefficient of the adaptive filter 904 so as to quickly cope with changes of a feedback channel.

Figure 10:
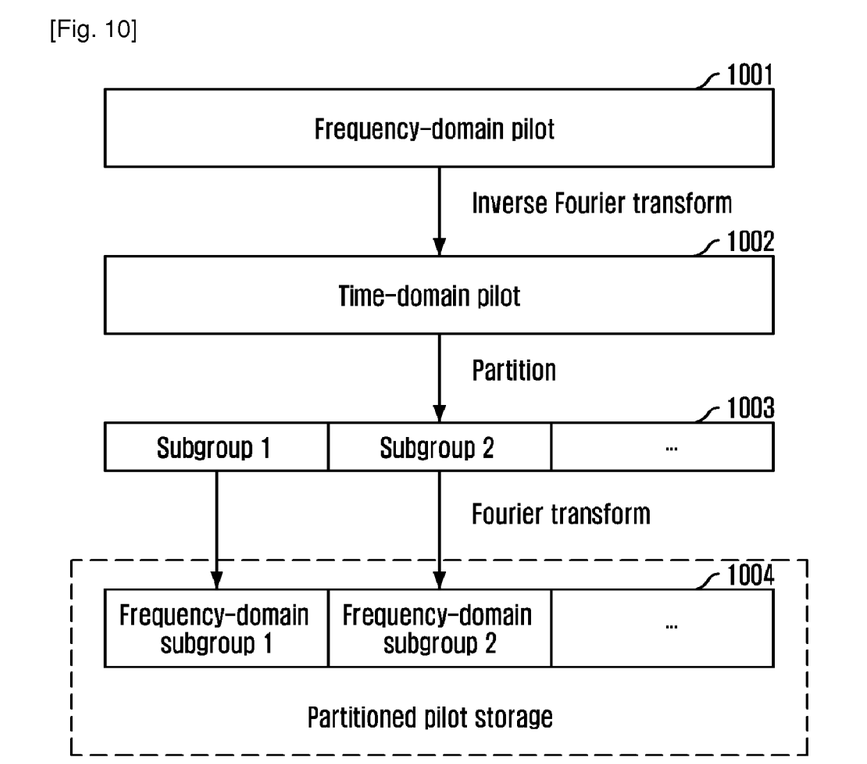
FIG. 10 is a diagram illustrating a configuration of a pilot to be stored in a partitioned-pilot storage illustrated in FIG. 9 in accordance with an embodiment of the present invention.
Figure 11:
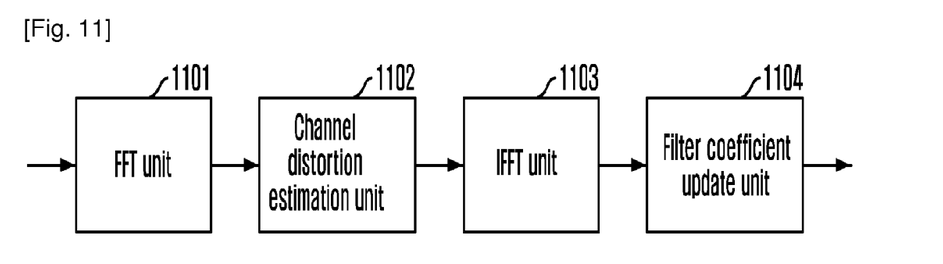
FIG. 11 is a block diagram showing a filter coefficient creator for creating a filter coefficient by using a partitioned pilot illustrated in FIG. 9 in accordance with an embodiment of the present invention.

A method for increasing the number of times of filter coefficient creation using the partitioned-pilot storage 906 will now be described with reference to FIGS. 10 and 11. In FIGS. 10 and 11, the method for increasing the number of times of filter coefficient creation is applied to a terrestrial Digital Multimedia Broadcasting (DMB) system employing an Orthogonal Frequency Division Multiplexing (OFDM) modulation technique. However, the present invention is not limited thereto.

FIG. 10 is a diagram illustrating a configuration of a pilot to be stored in the partitioned-pilot storage 906 illustrated in FIG. 9.

Referring to FIG. 10, a frequency-domain pilot 1001 corresponding to one OFDM symbol is converted into a time-domain pilot 1002 through inverse Fourier transform (IFT). The time-domain pilot 1002 is partitioned into a plurality of subgroups 1003. Thereafter, Fourier transform (FT) is performed on each of the subgroups 1003, thereby obtaining partitioned frequency-domain pilots 1004. Then, the partitioned frequency-domain pilots are stored in the partitioned-pilot storage 906.

FIG. 11 is a block diagram showing the filter coefficient creator 905 illustrated in FIG. 9, which creates a filter coefficient by using the partitioned pilot.

Referring to FIG. 11, the filter coefficient creator 905 includes a fast Fourier transform (FFT) unit 1101, a channel distortion estimation unit 1102, an inverse fast Fourier transform (IFFT) unit 1103, and a filter coefficient update unit 1104.

The FFT unit 1101 converts a portion of the output signal (i.e., a signal without a feedback signal) of the subtractor 903, which corresponds to one subgroup stored in the partitioned-pilot storage 906, into a frequency-domain signal. The channel distortion estimation unit 1102 estimates channel distortion by using the frequency-domain signal converted by the FFT unit 1101, and a subgroup of the partitioned-pilot storage 906 corresponding to an output of the FFT unit 1101.

The IFFT unit 1103 converts a distortion signal estimated by the channel distortion estimation unit 1102 into a time-domain signal ($\tilde{e}$). The filter coefficient update unit 1104 calculates a filter tap coefficient by using the time-domain signal outputted from the IFFT unit 1103 based on Equation 1 above. Thereafter, the filter coefficient update unit 1104 transmits the calculated filter tap coefficient to the adaptive filter 904.

Figure 12:
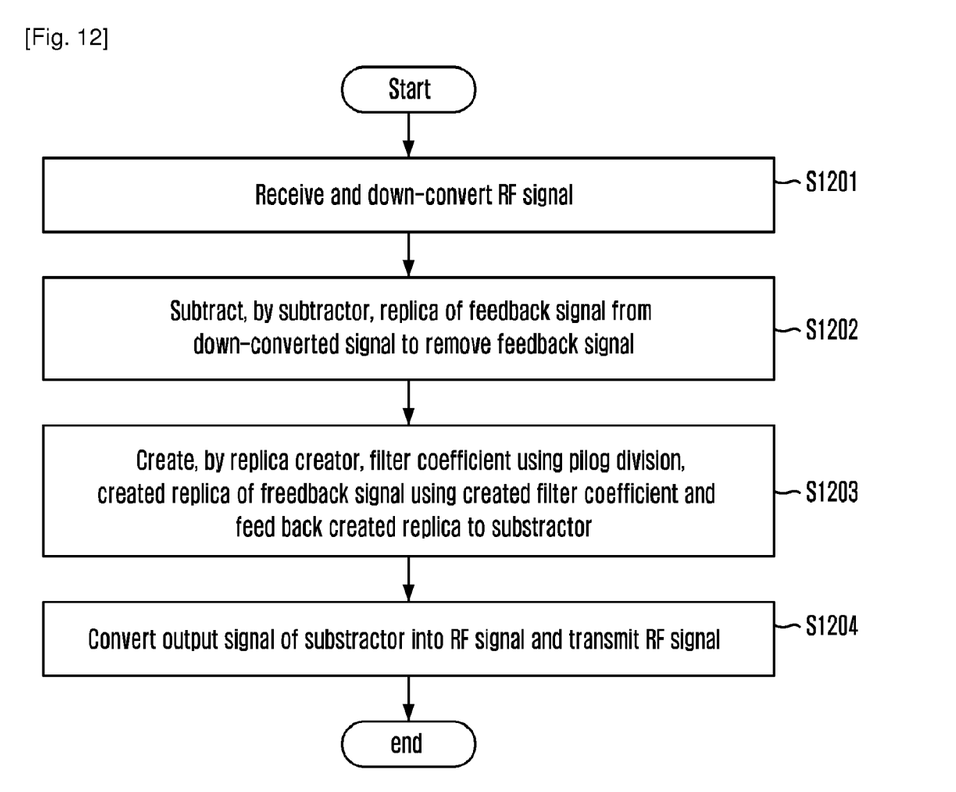
FIG. 12 is a flowchart describing an on-channel repeating method capable of removing feedback signals based on pilot partitioning in accordance with an embodiment of the present invention.

FIG. 12 is a flowchart of an on-channel repeating method capable of removing feedback signals based on pilot partitioning in accordance with an embodiment of the present invention.

In operation S1201, the RF receiver 902 receives an RF signal via the Rx antenna 901 from a main transmitter or another repeater, and down-converts the received RF signal into a signal of a predetermined band.

In operation S1202, the subtractor 903 subtracts a replica of a feedback signal from the down-converted signal of the predetermined band, thereby removing the feedback signal.

In operation S1203, the replica creator 909 creates a filter coefficient based on pilot partitioning, creates a replica of the feedback signal by using the created filter coefficient, and feeds back the created replica to the subtractor 903.

In operation S1204, the RF transmitter 907 converts an output signal (i.e., a signal without a feedback signal) of the subtractor 903 into an RF signal, and transmits the RF signal via the Tx antenna 908.

Figure 13:
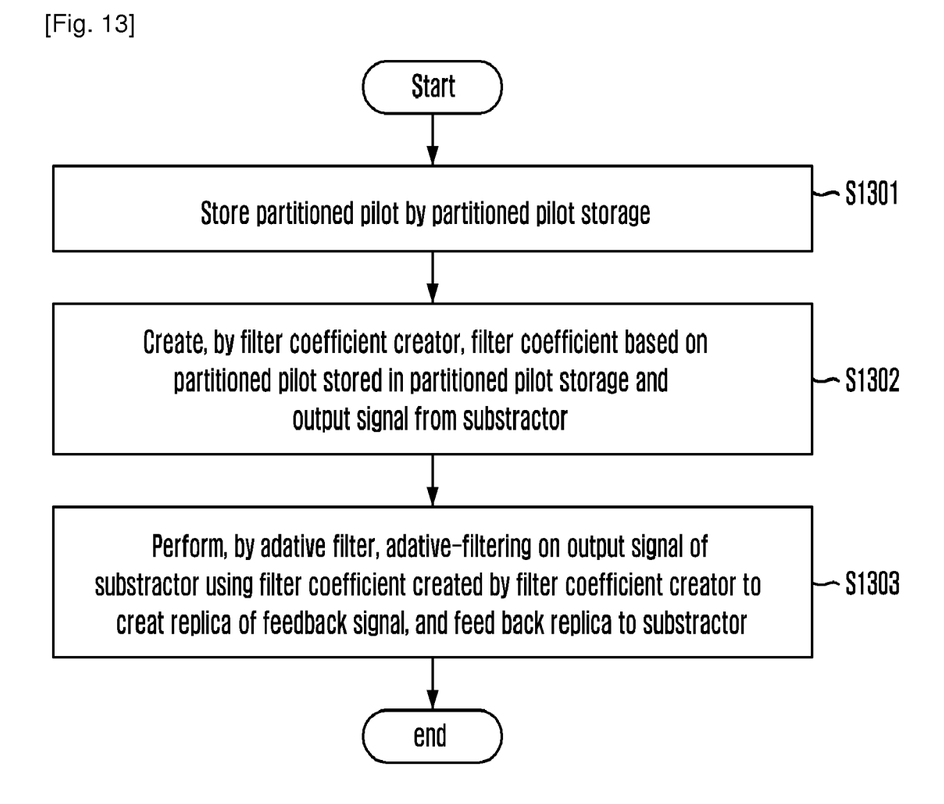
FIG. 13 is a flowchart describing a replica creation operation of FIG. 12 in accordance with an embodiment of the present invention.

FIG. 13 is a block diagram of the replica creation in operation S1203 of FIG. 12 in accordance with an embodiment of the present invention.

In operation S1301, the partitioned-pilot storage 906 stores a partitioned pilot to be used at the filter coefficient creator 905.

In operation S1302, the filter coefficient creator 905 creates a filter coefficient, i.e., a filter tap coefficient used at the adaptive filter 904, based on the partitioned pilot stored in the partitioned-pilot storage 906 and an output signal (i.e., a signal without a feedback signal) of the subtractor 903.

In operation S1303, the adaptive filter 904 creates a replica of the feedback signal by performing adaptive filtering on the output signal of the subtractor 903 by using the filter coefficient created by the filter coefficient creator 905, and feeds back the created replica to the subtractor 903.

The on-channel repeater with improved feedback signal removal performance and the method thereof in accordance with the embodiments of the present invention are suitable for broadcasting, such as Advanced Television Systems Committee (ATSC), Digital Video Broadcasting (DVB), Digital Multimedia Broadcasting (DMB), Terrestrial Integrated Services Digital Broadcasting (ISDB-T), etc., and communication such as Wireless Broadband (Wibro), Code Division Multiple Access (CDMA), etc. However, the present invention is not limited to them, and is applicable to any environment that requires a repeater for configuration of a general single frequency network.

The method of the present invention described above may be programmed for a computer. Codes and code segments constituting the computer program may be easily inferred by a computer programmer of ordinary skill in the art to which the present invention pertains. The computer program may be stored in a computer-readable recording medium, i.e., data storage, and it may be read and executed by a computer to realize the method of the present invention. The recording medium includes all types of computer-readable recording media.

The present application contains subject matter related to Korean Patent Application Nos. 2007-0102111 and 2007-0109608, filed in the Korean Intellectual Property Office on Oct. 10, 2007, and Oct. 30, 2007, respectively, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. An on-channel repeater, comprising:
a receiver for receiving a signal;
a subtractor for subtracting a replica of a feedback signal from the signal received in the receiver to remove the feedback signal;
a replica creator for creating a filter coefficient using pilot partitioning, creating a replica of the feedback signal using the created filter coefficient, and feeding back the created replica to the subtractor; and
a transmitter for transmitting an output signal of the subtractor.

2. The on-channel repeater of claim 1, wherein the replica creator comprises:
a partitioned-pilot storage for storing a partitioned pilot;
a filter coefficient creator for creating a filter coefficient based on the partitioned pilot stored in the partitioned-pilot storage and an output signal of the subtractor; and
an adaptive filter for creating a replica of the feedback signal by performing adaptive filtering on the output signal of the subtractor using the filter coefficient created by the filter coefficient creator, and feeding back the created replica to the subtractor.

3. The on-channel repeater of claim 2, wherein the partitioned-pilot storage stores a plurality of partitioned frequency-domain pilots.

4. The on-channel repeater of claim 3, wherein the partitioned-pilot storage stores the plurality of partitioned frequency-domain pilots obtained by converting a frequency-domain pilot into a time-domain pilot, partitioning the time-domain pilot into a plurality of subgroups, and converting the partitioned subgroups into respective frequency-domain pilots.

5. The on-channel repeater of claim 2, wherein the filter coefficient creator creates a filter coefficient based on the partitioned pilot stored in the partitioned-pilot storage and the output signal of the subtractor, and the filter coefficient creator creates the filter coefficient at a filter-coefficient update interval reduced according to the partitioned pilot stored in the partitioned-pilot storage.

6. The on-channel repeater of claim 5, wherein the filter coefficient creator comprises:

a Fast Fourier Transform (FFT) unit for converting a portion of the output signal of the subtractor, which corresponds to one subgroup of the partitioned-pilot storage into a frequency-domain signal;

a channel distortion estimation unit for estimating channel distortion by using the frequency-domain signal converted by the FFT unit and a subgroup corresponding to an output of the FFT unit;

an inverse Fast Fourier Transform (IFFT) unit for converting a distortion signal estimated by the channel distortion estimation unit into a time-domain signal; and a filter coefficient update unit for calculating a filter coefficient by using the time-domain signal outputted from the IFFT unit and transmitting the filter coefficient to the adaptive filter.

7. An on-channel repeating method, comprising:
receiving a signal;
subtracting a replica of a feedback signal from the received signal to remove the feedback signal;
creating a filter coefficient using pilot partitioning, creating a replica of the feedback signal by using the created filter coefficient, and feeding back the created replica to said subtracting of the replica; and
transmitting a signal from which the feedback signal is removed.

8. The on-channel repeating method of claim 7, wherein said creating of the replica comprises:
storing a partitioned pilot;
creating a filter coefficient based on the stored partitioned pilot and the signal without a feedback signal; and
creating a replica of the feedback signal by performing adaptive filtering on the signal without a feedback signal by using the created filter coefficient, and
feeding back the replica to said subtracting of the replica.

9. The on-channel repeating method of claim 8, wherein said storing of the partitioned pilot comprises storing a plurality of partitioned frequency-domain pilots.

10. The on-channel repeating method of claim 9, wherein said storing of the plurality of partitioned pilots comprises:
converting a frequency-domain pilot into a time-domain pilot;
partitioning the time-domain pilot into a plurality of subgroups; and
converting the partitioned subgroups into respective frequency-domain pilot signals.

11. The on-channel repeating method of claim 8, wherein the filter coefficient is created based on the stored partitioned pilot and the signal without a feedback signal at a filter-coefficient update interval reduced according to the stored partitioned pilot.

12. The method of claim 11, wherein said creating of the fiber coefficient comprises:
converting a portion of the signal without a feedback signal corresponding to one stored subgroup into a frequency-domain signal;
estimating channel distortion by using the converted frequency-domain signal and a subgroup corresponding to the converted frequency-domain signal;
converting the estimated distortion signal into a time-domain signal; and
calculating a filter coefficient by using the converted time-domain signal.

* * * * *